US007148907B2

(12) United States Patent
Smith et al.

(10) Patent No.: US 7,148,907 B2
(45) Date of Patent: Dec. 12, 2006

(54) MIXED BUT INDISTINGUISHABLE RASTER AND VECTOR IMAGE DATA TYPES

(75) Inventors: Alvy Ray Smith, Seattle, WA (US); John Bradstreet, Redmond, WA (US); Jonathan Edgar Fay, Woodinville, WA (US); Ajai Sehgal, Woodinville, WA (US); Tanuja Abhay Joshi, Redmond, WA (US); John Fitzgerald Bronskill, Bellevue, WA (US); Daniel Gwozdz, Issauquah, WA (US); Steven Andrew Cover, Redmond, WA (US); Nicholas John Clay, Bellevue, WA (US); Edward W. Connell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 257 days.

(21) Appl. No.: 10/891,674

(22) Filed: Jul. 15, 2004

(65) Prior Publication Data

US 2004/0257367 A1 Dec. 23, 2004

Related U.S. Application Data

(63) Continuation of application No. 09/361,475, filed on Jul. 26, 1999, now Pat. No. 6,870,545.

(51) Int. Cl.
 *G09G 5/377* (2006.01)
(52) U.S. Cl. ...................... 345/629; 345/619
(58) Field of Classification Search ............... 345/619, 345/629
See application file for complete search history.

(56) References Cited

U.S. PATENT DOCUMENTS

| 5,025,407 | A |   | 6/1991 | Gulley et al. |
|---|---|---|---|---|
| 5,490,246 | A | * | 2/1996 | Brotsky et al. ............. 715/763 |
| 5,521,722 | A |   | 5/1996 | Colvill et al. |
| 5,754,750 | A |   | 5/1998 | Butterfield et al. |
| 5,767,857 | A | * | 6/1998 | Neely .......................... 345/427 |
| 5,809,179 | A | * | 9/1998 | Marimont et al. .......... 382/254 |
| 5,835,086 | A |   | 11/1998 | Bradstreet |
| 5,872,902 | A |   | 2/1999 | Kuchkuda et al. |
| 6,134,338 | A | * | 10/2000 | Solberg et al. ............. 382/113 |
| 6,184,860 | B1 | * | 2/2001 | Yamakawa ................... 715/823 |
| 6,396,947 | B1 | * | 5/2002 | Doll ........................... 382/162 |
| 2001/0013869 | A1 | * | 8/2001 | Nozawa ..................... 345/473 |

FOREIGN PATENT DOCUMENTS

EP          0619554 A2 * 10/1994

OTHER PUBLICATIONS

Automatic registration of SPOT images and digitized maps Roux, M.; Image Processing, 1996. Proceedings., International Conference on vol. 1, Sep. 16-19, 1996 pp. 625-628 vol. 2 Digital Object Identifier 10.1109/ICIP.1996.560951.*

(Continued)

*Primary Examiner*—Kee M. Tung
*Assistant Examiner*—J. Amini
(74) *Attorney, Agent, or Firm*—Shook, Hardy & Bacon, L.L.P.

(57) ABSTRACT

An image processing application employs the concept of integral pre-multiplied alpha channel, and combines the techniques of multi-resolution representation, graph-structured representation, and automatic and intelligent data type conversion in order to permit a computer user to mix and manipulate both raster and vector based images in a single user interface while remaining unaware of the different data types underlying the images.

10 Claims, 11 Drawing Sheets

OTHER PUBLICATIONS

Integrating GIS's and Remote Sensing Image Analysis Systems by Unifying Knowledge Representation Schemes. Fangiu Wang, 1991, IEEE, pp. 656-664.*

Shantzis, Michael A., "A Model for Efficient and Flexible Image Computing", *Computer Graphics Proceedings, Annual Conference Series, 1994*, Association for Computing Machinery, 1994, pp. 147-154.

Smith, Alvy, "The αδγ's of Digital Media Coverage", *Proceedings Graphics Interface '98*, Jun. 18-20, 1998, pp. 51-56.

Smith, Alvy, "The Stuff of Dreams", *Computer Graphics World*, Jul. 1998, pp. 27-29.

Smith, Alvy "Image Compositing Fundamentals" Microsoft Technical Memo 4, Aug. 15, 1995.

Smith, Alvy, "Alpha and the History of Digital Compositing", Microsoft Technical Memo 7, Aug. 15, 1995.

Blinn, James F., "Jim Blinn's Corner: Compositing Part 1: Theory", *IEEE Computer Graphics & Applications*, Sep. 1994, pp. 83-87.

Blinn, James F., "Jim Blinn's Corner: Compositing Part 2: Practice", *IEEE Computer Graphics and Applications*, Nov. 1994, pp. 78-82.

Porter, Thomas et al., "Compositing Digital Images", *Proceedings of SIGGRAPH '84*, Association for Computing Machinery, 1984, pp. 49-55.

Rosenfeld, Azriel et al, *Digital Picture Processing, 2nd Edition*, Chapter 11.2.2. "Borders", pp. 219-231, Academic Press, 1982.

* cited by examiner

RASTER SPRITE IMAGE

RASTER SPRITE IMAGE DATA

MIXED BUT INDISTINGUISHABLE RASTER AND VECTOR IMAGE DATA TYPES

RELATED APPLICATION

This application is a continuation of U.S. application Ser. No. 09/361,475 filed on Jul. 26, 1999 now U.S. Pat. No. 6,870,545, entitled "Mixed But Indistinguishable Raster and Vector Image Data Types," which is herein incorporated by reference in its entirety.

TECHNICAL FIELD

This invention relates generally to image processing and, more particularly, relates to the mixing and manipulation of raster and vector image data types in a single user interface in such a manner that the two image data types are indistinguishable to a user.

BACKGROUND OF THE INVENTION

There currently exist two distinct data types used to generate and represent images on computers. These data types are typically referred to as "raster" and "vector" data.

A "raster" is technically a rectangular array of pixels sequentially presented, or "scanned," to display an image on a cathode ray tube. In subsequent usage, and in this specification, the term "raster" is used more broadly, in that all pixels of a raster image may be presented simultaneously or sequentially. For example, certain current display devices such as LCD (Liquid Crystal Display), DMD (Digital Mirror Device), and plasma panels display a matrix of pixels, but do so by displaying all pixels simultaneously rather than line by line. Thus, as currently used, the term "raster data" simply refers to a matrix of discrete pixels or samples, which when displayed together form the desired image. Raster data is sometimes also referred to as "sampled" data, because the raster of pixels represents a set of discrete samplings of the theoretically continuous original image.

The term "vector," when applied to image data, refers to a method of generating or storing images wherein the image is represented succinctly by description, rather than by listing each pixel in the image. Any geometric shape can be represented as a vector graphic, and any arbitrary shape may be represented by a combination of such geometric shapes, and hence as a vector graphic. Thus for example, in vector representation, a straight line segment might be described by its two endpoints, or by its slope, length, and origin. Likewise, a circle could be described in vector representation by describing its radius and center point. Accordingly, vector data is sometimes referred to as "geometric" data. Vector data is continuous rather than discrete, since it defines an image by description rather than by listing samples. Consequently, because most current display devices display discrete pixels rather than continuous images, a vector image must usually be "rasterized" before it can be displayed. Vector data is recognized to be "resolution independent" because it defines what is essentially an infinite number of points by way of a succinct description, and accordingly may be rasterized at any resolution desired without undue difficulty.

The differences between these two data types have lead to the development of two different ways of treating data, and two distinct types of user interfaces for manipulating image data. This is partially a result of the fact that certain operations are more easily executed on vector data, while other operations are more easily executed on raster data. Indeed, some operations are possible only with one data type. So, for example, an operation to rescale a vector image involves a simple mathematical calculation; with respect to the vector circle described above, a resealing might simply involve multiplying the circle's radius by the desired value. The same operation on a raster circle would involve recalculating the positions of all of the pixels in the image, and potentially interpolating to generate new pixels to "fill in" between existing pixels if the circle is being magnified. In contrast, an operation such as "blur" is an inherently raster effect, because it involves the analysis of each pixel and its neighbors. Thus, it is generally not even possible to blur a vector image without first rasterizing it.

Accordingly, user interfaces developed for image generation and processing are traditionally tailored to one or the other of these data types. For example, the two distinct applications MacPaint and MacDraw, developed for the Apple Macintosh, treat raster and vector data types respectively. Similarly, Adobe has developed the separate applications Photoshop and Illustrator to handle raster and vector data types respectively. The user interface paradigms for the two approaches are generally quite different. The typical raster image user interface is based on the technology used to display raster images; accordingly, the typical raster image workspace is a finite rectangular space, and the user is confined to that rectangular space. Actions taken outside of the rectangle, such as a line drawn to extend past the rectangle's edge, are normally ignored or cropped. This rectangle of pixels is stored and modified in accordance with user input. Because of the extensive memory requirements associated with storing raster images, it is standard practice to store only the latest version of the raster image, making multiple "undo" or "redo" operations difficult.

The traditional "vector graphics" user interface varies from the traditional "raster graphics" interface in that it does not limit the user to a rectangular space. Rather it allows the user to place and move images within an infinite workspace. This is a consequence of the fact that a vector image is stored as a succinct description rather than as a rectangular array of pixels. As well, certain modem raster image applications have departed from the rectangular paradigm, allowing a user to move raster images about in an infinite workspace. For example, Altamira Composer used the concept of "integral pre-multiplied alpha channel," which will be discussed below, to arrive at non-rectangular raster images, sometimes referred to as "sprites," which may be moved about an infinite workspace. Photoshop by Adobe allows the use of sprites, albeit within the traditional rectangular raster graphics paradigm. Thus, the art of image processing still remains one of two schools of thought, with two distinct user interface paradigms generally adhered to by the creators of imaging applications.

Although there currently exist applications which allow the simultaneous display of both raster and vector images, none of these applications provide indistinguishable treatment of raster and vector data types. Accordingly the use of differing data types is quite apparent to the user of such applications. For example, a user may insert a raster image into the workspace in the application CorelDraw produced by Corel Corporation, even though CorelDraw is tailored to vector graphics. However, the inserted raster image will not be treated the same as a vector image, in that certain operations made available for vector images will not be available for the raster image, or will require additional user steps to accomplish, relative to execution of the same operation on a vector image. This forces the user to become aware of the two data types in use. As a further example, a user can insert vector images into the Photoshop workspace, but such images are immediately rasterized so that the user is only manipulating raster images. The image processing application Canvas by Deneba allows a user to manipulate both raster and vector images in the same user interface, but the user must select between separate raster and vector menu functions for the separate data types, and hence the different data types in use are not at all indistinguishable to the user.

Thus, a user of existing image generation and manipulation applications cannot interact with both raster and vector data types without being made aware that they are in fact using two data types. A typical user of image generation and manipulation applications is not versed in the nuances of the two data types; such a user is therefore likely to be confused and frustrated by an application which requires the user to have knowledge of the different data types, or which visibly treats different data types differently. Even more baffling to a typical user is the often necessary utilization of multiple applications to work with multiple data types, and the ensuing file conversions and integrations which such processing entails. Accordingly, an image processing application is needed whereby the user may freely mix and manipulate images of both data types without the need to know which image is of which type, and without being made aware of any distinction between the data types used. This would greatly enhance and simplify the user's experience, and would eliminate the need for the user to make technical decisions based on data type.

SUMMARY OF THE INVENTION

In accordance with this need, the present invention is generally realized in a computer application for image manipulation which allows for the mixing and manipulation of both raster and vector images in a single user interface. Furthermore, this mixing is accomplished in a manner such that the data type of a particular image is indistinguishable to the user of the application, and in such a manner that all image manipulation operations which are available within the interface, such as "rescale," "undo," and "redo," are usable regardless of the data type to which they are applied.

When using an application which implements the present invention, a typical user is unaware that two different data types are being used. This is partially a result of the use of techniques which accelerate the computer's manipulation of raster images so that it appears to the user to occur at generally the same speed as the computer's manipulation of vector images. These techniques include graph-structured representation and multiple-resolution representation. The use of the integral pre-multiplied alpha concept creates shaped raster images which may be manipulated in an infinite workspace in much the same way as vector images.

Further enhancing the indistinguishability of the data types is the technique of automatic and intelligent conversion of data types. This assures that image data is only converted from one type to the other at the point when such conversion is necessary. Furthermore, it is preferred that conversion from vector data to raster data automatically takes place at the correct resolution for the current output device to minimize unnecessary conversions and to make data type conversions, and thus the existence of different data types, invisible to the typical user.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
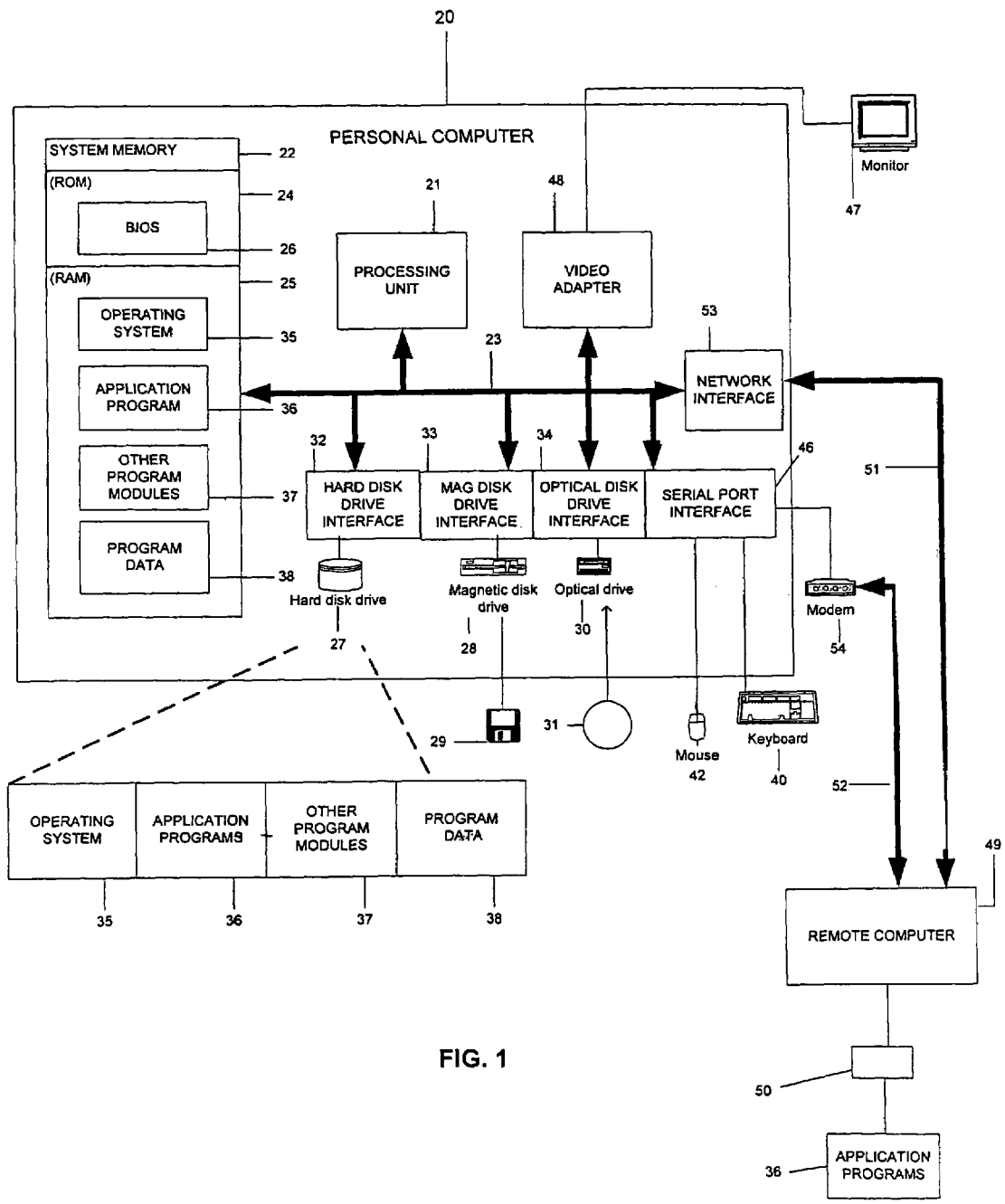
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. Steps or elements of the invention discussed as occurring or being located upon one computer may also be practiced in distributed computing environments where tasks are performed by remote processing devices that are linked through a communications network. In a distributed computing environment, program modules may be located in both local and remote memory storage devices.

With reference to FIG. 1, part of an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

A personal computer 20 used to implement the present invention may operate in a networked environment using logical connections to one or more remote machines, such as remote computer 49. The remote machine 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. Program modules depicted relative to the personal computer 20, or portions thereof, may be stored in the remote memory storage device.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, raster and vector data types may be mixed and manipulated by the user in one workspace or user interface in such a way that the use of two different data types is not apparent to the user. In order to create this indistinguishability, a combination of techniques is employed to compensate for the differences between the data types in terms of file size and speed of manipulation, and to optimize conversions between data types. These techniques, which will be more fully explained below, are: (1) integral pre-multiplied alpha, (2) multi-resolution representation, (3) graph-structured representation, and (4) automatic and intelligent data type conversion.

Briefly, the integral pre-multiplied alpha concept allows rectangular raster images to take on arbitrary non-rectangular shapes. These shaped raster images are similar to vector images in some limited respects; for example, vector images are by definition shaped images.

Multi-resolution representation allows for the rescaling of these shaped raster images in an amount of time which is substantially the same as the amount of time required for rescaling vector images as perceived by the user, so that the user does not detect, from the amount of time required to execute an operation, the data type of the underlying image data.

The use of graph-structured representation allows for the rapid multiple undoing and redoing of operations on mixed images, i.e. images containing both data types. An additional benefit inherent in employing a graph-structured representation is that the original image data is preserved despite any operations applied.

Finally, the concept of automatic and intelligent type conversion aids in creating data type indistinguishability when a data manipulation operator can only handle one data type. In such cases, the image data must be converted to the data type which the operation can process; the concept of automatic and intelligent type conversion allows for conversion at the optimum time and at the optimum resolution to enhance the indistinguishability of the data types to the user.

Herein, two operations or actions are defined to take substantially the same amount of time if they both take less than a small amount of time on a human scale such as one or two seconds. Thus, for example, although an operation which requires one microsecond to execute differs in execution time by three orders of magnitude from an operation that takes one millisecond to execute, both operations take substantially the same amount of time to execute as defined herein. Furthermore, an operation is defined to take place transparently to the user if it takes place without further user interaction. For example, if a user requests a vector operation such as "outline" to be applied to a raster image, the operation is said to be executed transparently to the user if the raster image then appears on the display with an outline around it.

Figure 2A:
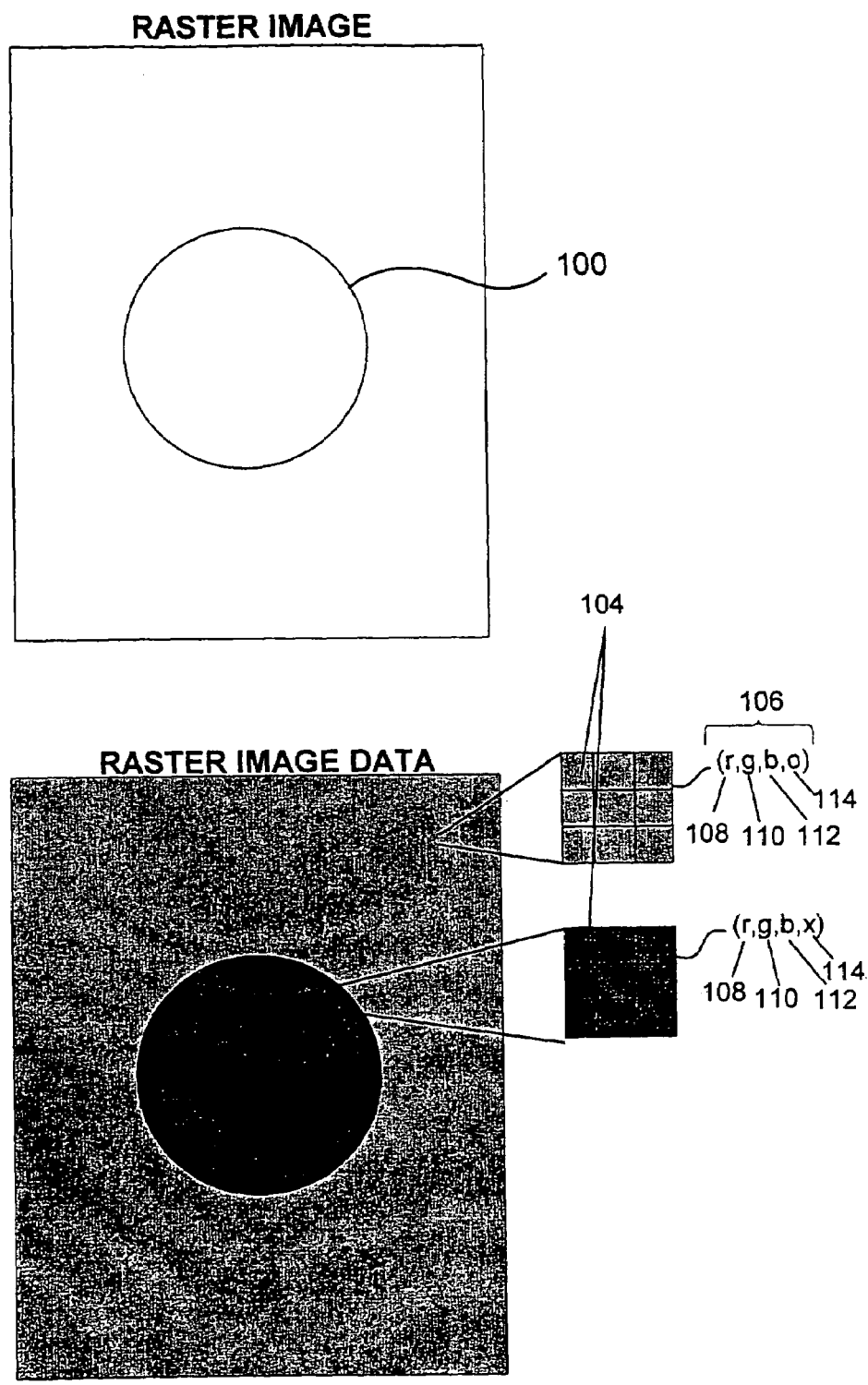
FIG. 2a illustrates a simplified representation of raster data corresponding to a circle.
Figure 2B:
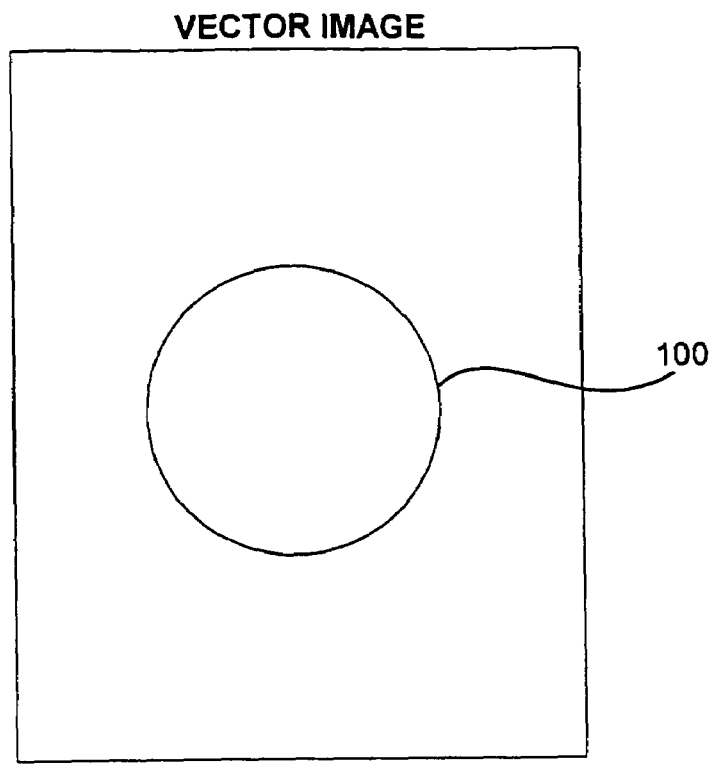
FIG. 2b illustrates a simplified representation of vector data corresponding to a circle.

FIGS. 2a and 2b are simplified representations of typical data corresponding to an image of a circle 100 stored in raster and vector representations respectively. It can be seen that in the raster representation of the circle 100, each pixel 104 of the image is stored as a quadruple 106. Although the data need not be in any particular physical arrangement, it is shown in a rectangular array corresponding to the image itself for ease of understanding. Each quadruple 106 typically contains the values of red 108, green 110, and blue 112 to be displayed by the corresponding pixel 104, as well as the transparency, or "alpha" 114, of the pixel. The value of alpha 114 is a number within a designated range. Values at one end of the range, for example "0", describe a transparent pixel, and values at the other end of the range, for example "1", describe an opaque pixel. To produce the image, the red 108, green 110, and blue 112 values are multiplied by the alpha value 114 to arrive at the correct image color and brightness. When two raster images are composited in such a manner that a pixel in one image overlaps a pixel in the other, the alpha values of the pixels will determine to what extent the color described by the associated color values will be represented at that location in the image data. In the most extreme cases, an opaque pixel will completely obscure any underlying pixels, while a transparent pixel will be completely obscured by underlying pixels.

In the vector representation of the circle 100 depicted in FIG. 2b, a succinct description 116 completely describes the image. In this example, the succinct description 116 describes the center point and radius of the circle, as well as the fill characteristics of the circle. It will be seen from this example that raster image files generally contain much more data than vector image files, and therefore it is generally more difficult or time consuming to perform many operations on raster data. Thus, in order for a user to be able to indiscriminately manipulate both data types in one space or interface, it will often be desirable for the image processing application to accelerate the processing of raster data so that it appears to occur in substantially the same amount of time as the processing of vector data. In other words, the typical user should not be able to discern the data type of an image based on the time required to execute an operation on the image.

Figure 2C:
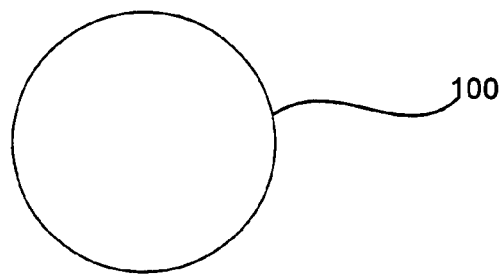
FIG. 2c illustrates a raster sprite and a simplified representation of the corresponding image data.
Figure 2C:
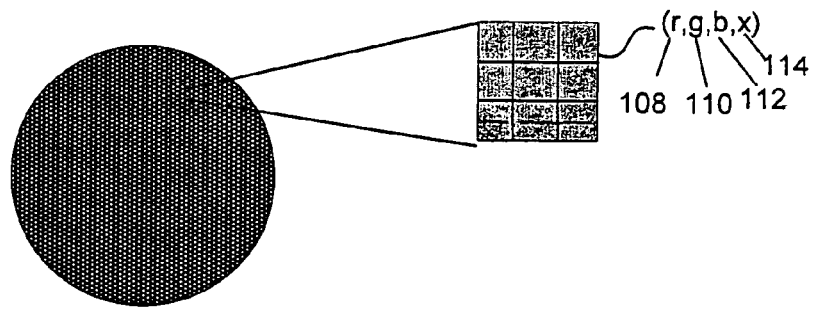

It can be seen from the preceding example that raster images are inherently rectangular in that they describe an array of pixels made up of rows and columns. The concept of integral pre-multiplied alpha recognizes that a pixel described by the quadruple (r,g,b,a) may equivalently be represented by the quadruple (a*r, a*g, a*b, a) where the red 108, green 110, and blue 112 values are pre-multiplied by the alpha 114 value. This technique was originally intended to eliminate the step of multiplication at the time of compositing the image for display, and thus to accelerate image rendering. However, it is more important to the present invention that this pre-multiplication results in a quadruple of (0,0,0,0) for any pixel having an alpha value of zero. These transparent pixels contain no information, and may or may not continue to be stored. Collecting the pixels with non-zero alpha values yields a shaped, non-rectangular raster image. Such shaped raster images are analogous to vector images in that they are not tied to a rectangular layer or workspace. The term "sprite" is often applied to shaped images whether raster-based or vector-based. A circular raster sprite created from the raster circle of FIG. 2a is depicted in FIG. 2c, as is the corresponding data. The invention is not limited to the use of integral pre-multiplied alpha to create raster sprites, as other techniques exist which may be utilized equivalently to create shaped raster images, and the alpha channel, if used, need not be pre-multiplied. Moreover, other color values may be used to describe pixels instead of red, green, and blue.

Preferably, raster and vector sprites are treated analogously. For example, the user may perform operations such as selecting and moving both raster and vector sprites, grouping unlike sprites, and arranging sprites hierarchically so that one sprite appears in the user interface to be in front of or behind another sprite of similar or different data type. Furthermore, the operation of selecting multiple sprites having different data types is preferably permitted.

Raster sprite files are much larger than corresponding vector sprite files, and represent the image data in an entirely different form. Rescaling of raster sprites requires resampling, a slow and computationally intensive process, while rescaling of vector sprites generally involves only trivial processing. This difference makes the rescaling of raster sprites by conventional means much more time consuming than the rescaling of vector sprites.

In order to make the rescaling of raster sprites indistinguishable from the rescaling of vector sprites, as perceived by the user, the technique of multi-resolution representation is preferably utilized. The technique of multi-resolution representation calls for storing a raster sprite at several image densities, or resolutions, prior to the user's request to rescale. Thus, when a user of the present invention initiates a rescale operation on a raster sprite, the computer retrieves the pre-stored image that corresponds to the desired resolution, eliminating the need to resample the image while the user waits. If no pre-stored image corresponds to the desired resolution, the desired image is calculated from the two pre-stored images that have resolutions closest to the desired resolution. Alternatively, in this case the desired image may be calculated using only one pre-stored image that has a resolution closest to the desired resolution. In this manner, rescaling of raster sprites may generally be accomplished at a rate comparable to the rate of rescaling of vector sprites. This acceleration of image processing accordingly maintains the user's perception of indistinguishability of the data types.

Figure 3:
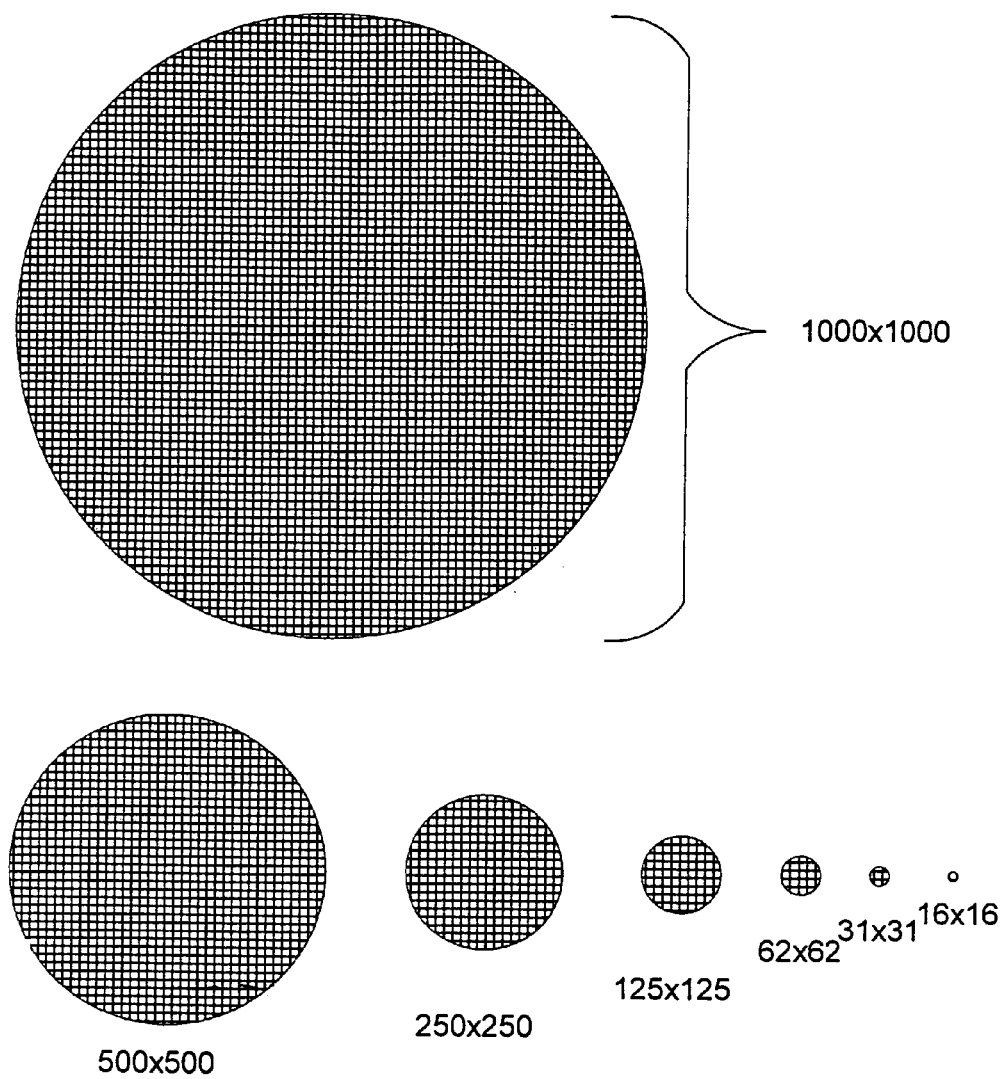
FIG. 3 illustrates an exemplary multi-resolution representation of a raster sprite.

It is generally not feasible to pre-store all possible desired resolutions, and thus ideally, versions of the raster sprite are pre-stored at resolutions according approximately to factors of two. Thus, an image 200 of nominal size 1000×1000 pixels might correspond to a pre-stored series of images of size 500×500, 250×250, 125×125, 62×62, 31×31, 16×16 pixels respectively, as depicted in FIG. 3. In this example, a rescaling by a factor of 0.5 would simply require retrieval of the pre-stored 500×500 image. Note that the schematic pixel representations in FIG. 3 physically correspond to a much coarser resolution than indicated in order to aid the eye. It is not critical what image resolutions are pre-stored, and accordingly, other resolutions may be used without departing from the scope of the invention. For example, it is possible to pre-store an image at resolutions according to factors of three, or according to any other criteria.

In order to maintain the user's perception of indistinguishable data types, it is desirable that multiple undo and redo operations are available with respect to a mixed image. This requires that speedy multiple undo and redo be available for raster data and vector data alike. Because of the large size typical of raster image files, it is generally impractical to store each preceding version of a mixed image for recall when the user desires a redo or undo operation which would return the image to the stored state. This is especially true if it is desired to provide an arbitrarily large or infinite number of redo or undo operations to the user, as is typically done with traditional vector image processing applications.

Figure 4:
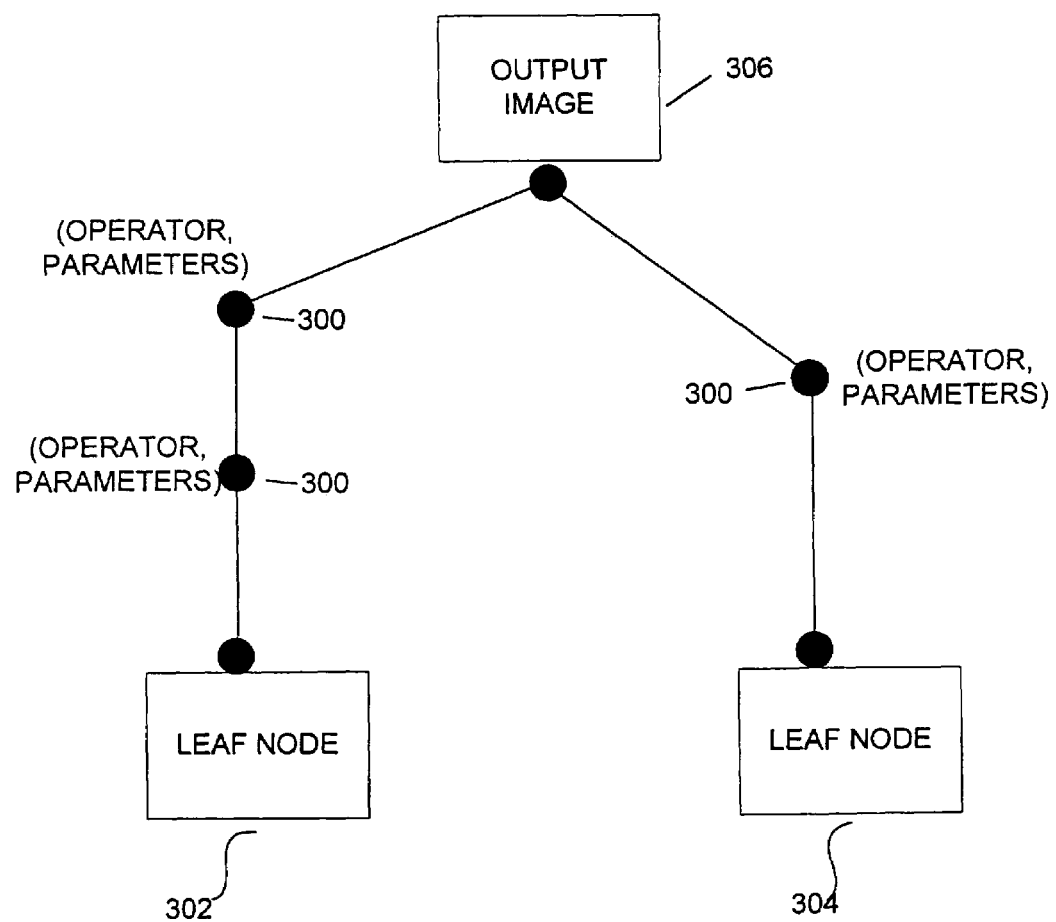
FIG. 4 illustrates a simplified schematic of a graph structure for storing image history.

Accordingly, to provide essentially unlimited undo and redo capability with respect to mixed images containing both raster and vector sprites, the technique of graph-structured representation is preferably employed. Using this technique, it is not necessary to store the image at each step of a series of user actions. Rather, the original image components, or sprites, and all subsequent operations executed on those sprites are stored as a directed acyclic graph, such as that illustrated in simplified schematic form in FIG. 4. The graph structure illustrated in FIG. 4 is a simplified representation of one possible graph structure usable to implement an embodiment of the invention. One skilled in the art will appreciate that alternative graph structures may equivalently be used within the scope of this embodiment of the invention. In the illustrated structure, each node 300 represents an operation such as "blur," "rotate," and so on. Each operation may have parameters associated with it, such as "amount of blur," "angle of rotation," etc. Leaf nodes 302 and 304 contain or generate image sprites, while other nodes represent operations that manipulate or transform these sprites. The root node 306 is the desired output of the graph.

Figure 5A:
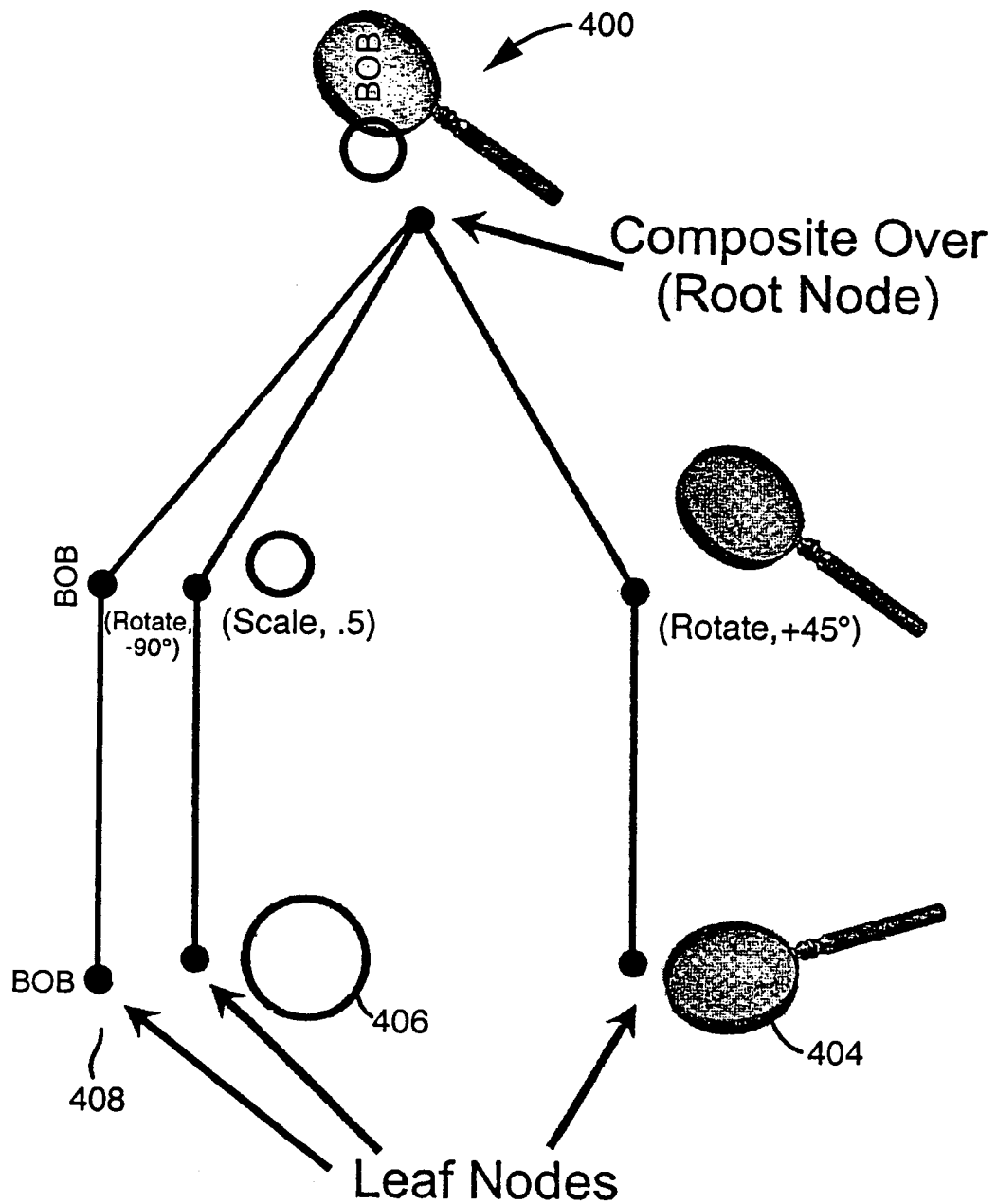
FIG. 5a illustrates a simplified schematic of a graph structure for storing image history.

Thus, for example, a user may start with raster 404 and vector 406, 408 sprites within the user interface, and may then rotate the raster sprite 404 and the vector sprite 408, and scale the vector sprite 406, and subsequently overlay the image sprites. The resulting graph after these operations is depicted schematically in FIG. 5a. The root node 400 represents the desired output of the series of operations.

Using this technique, an undo operation would preferably entail restoring the individual sprites, retrieving the graph of operations, and performing the operations in the graph, with their associated parameters, up to the desired point, which might be one or more steps short of the currently displayed image. Thus, an undo operation is preferably achieved by recalculating a previous result, rather than by storing in memory the result itself. This method of tracking image history relies on computing speed rather than computer memory capacity to function effectively.

Figure 5B:
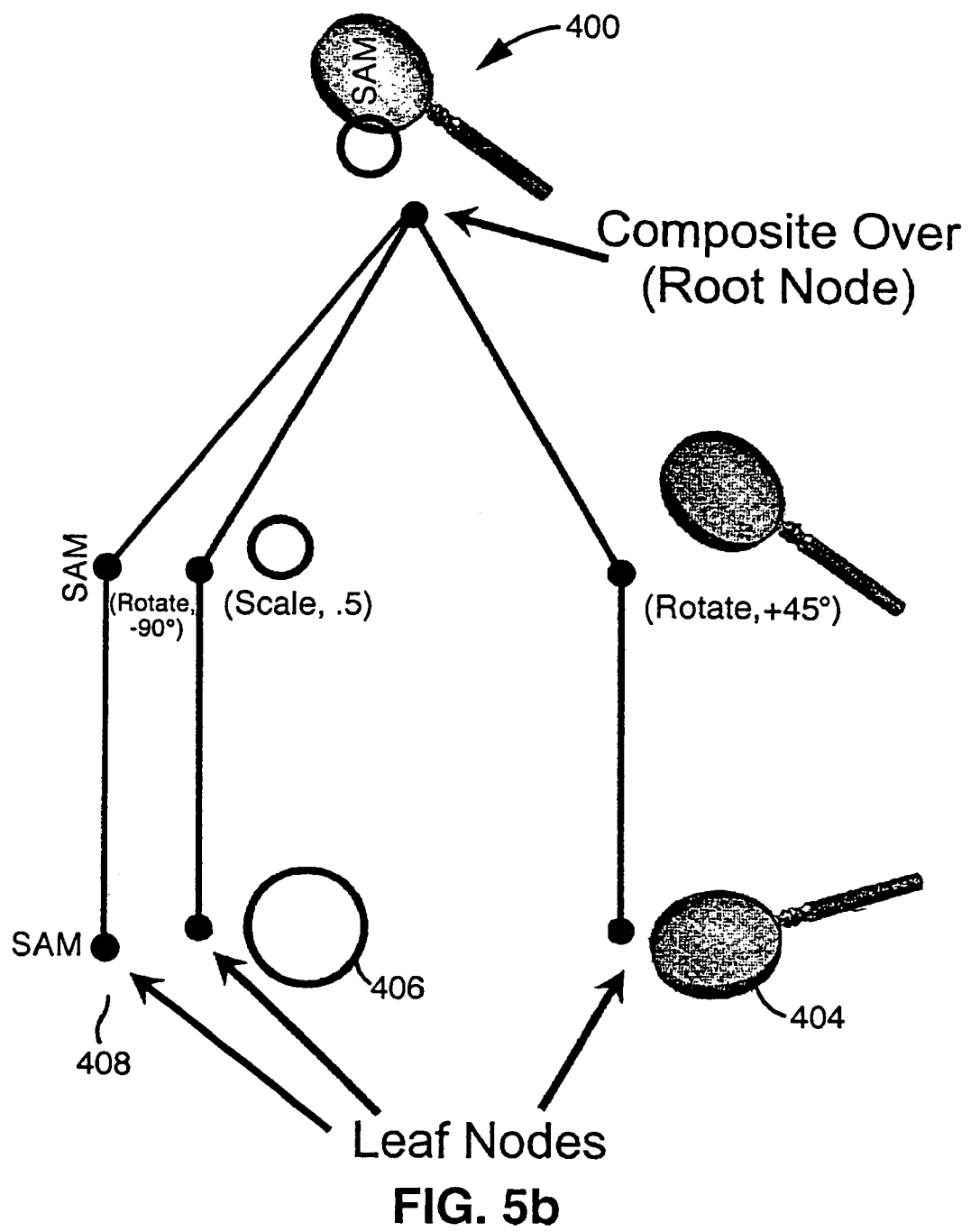
FIG. 5b illustrates the graph structure of FIG. 5a after additional user actions.

In a similar manner, "redo" operations preferably involve redoing a series of operations starting from the leaf sprites to arrive at the desired image rather than retrieving a stored result image. A beneficial consequence of utilizing the technique of graph-structured representation is illustrated in FIG. 5b. It is shown that the user has chosen to change "BOB" to "SAM". Utilizing the graph-structured representation, this change is automatically carried into effect by simply modifying the leaf sprite 408, and redoing all of the operations in the graph to arrive at the root node 400.

It will be appreciated that the use of a graph-structured representation inherently provides for the preservation of the original image data despite the application of many different operators to the data. This is a consequence of the fact that the graph structure stores any original image data as a node of the graph. Thus, the original image data does not degrade even after the user initiates one or more image manipulation operations with respect to that data.

Although it is preferred that image history is stored as described above, one of skill in the art will appreciate that this method is not critical in every embodiment of the invention. For example, it may sometimes be desirable to trade memory usage for speed by storing or "caching" a particularly computationally intensive intermediate result at the corresponding graph node, so that it need not be recomputed when the graph is re-executed.

With respect to digital painting data, which is produced by overlaying many layers of raster data along a vector path, it may be desirable to use alternative methods of storing image history. Such methods are described in U.S. Pat. No. 5,835,086 to Bradstreet et al, entitled "Method And Apparatus For Digital Painting" and in U.S. application Ser. No. 09/216,643 by Bradstreet, entitled "Method and System For Undoing Multiple Editing Operations." The foregoing patent and application are hereby incorporated by reference in their entirety.

Automatic and intelligent data type conversion is preferably utilized to maintain data type indistinguishability despite the performance of necessary data type conversions. When both raster and vector image data are manipulated in a single user interface, it is often necessary to convert image data of one type into image data of the other type. For example, as mentioned earlier, most modem display devices only display discrete pixels of information. Thus, vector image data must generally be rasterized prior to rendering on a modem display device. Furthermore, certain operations such as "blur" can generally only operate on raster data, while other operations such as "outline" can generally only operate on vector data. Data type conversion thus becomes necessary whenever an operation must be executed on an image of a data type which the operation does not support.

Conversion from vector data to raster data entails a loss of information, given that a vector image may be rasterized at any resolution, and is thus resolution independent, while raster data contains only a finite number of pixels. Additionally, many operations are more easily executed when the target data is in vector format. Similarly, conversion of raster data to vector data may also potentially entail inefficiencies and a loss of image quality. Automatic and intelligent data type conversion preferably minimizes these problems by following two principles: (1) conversion between data types takes place as late as possible in the directed acyclic graph of operations, and (2) conversion parameters for conversion of vector to raster data are automatically selected so that resolution is sufficient but not excessive for the current output device.

Figure 6:
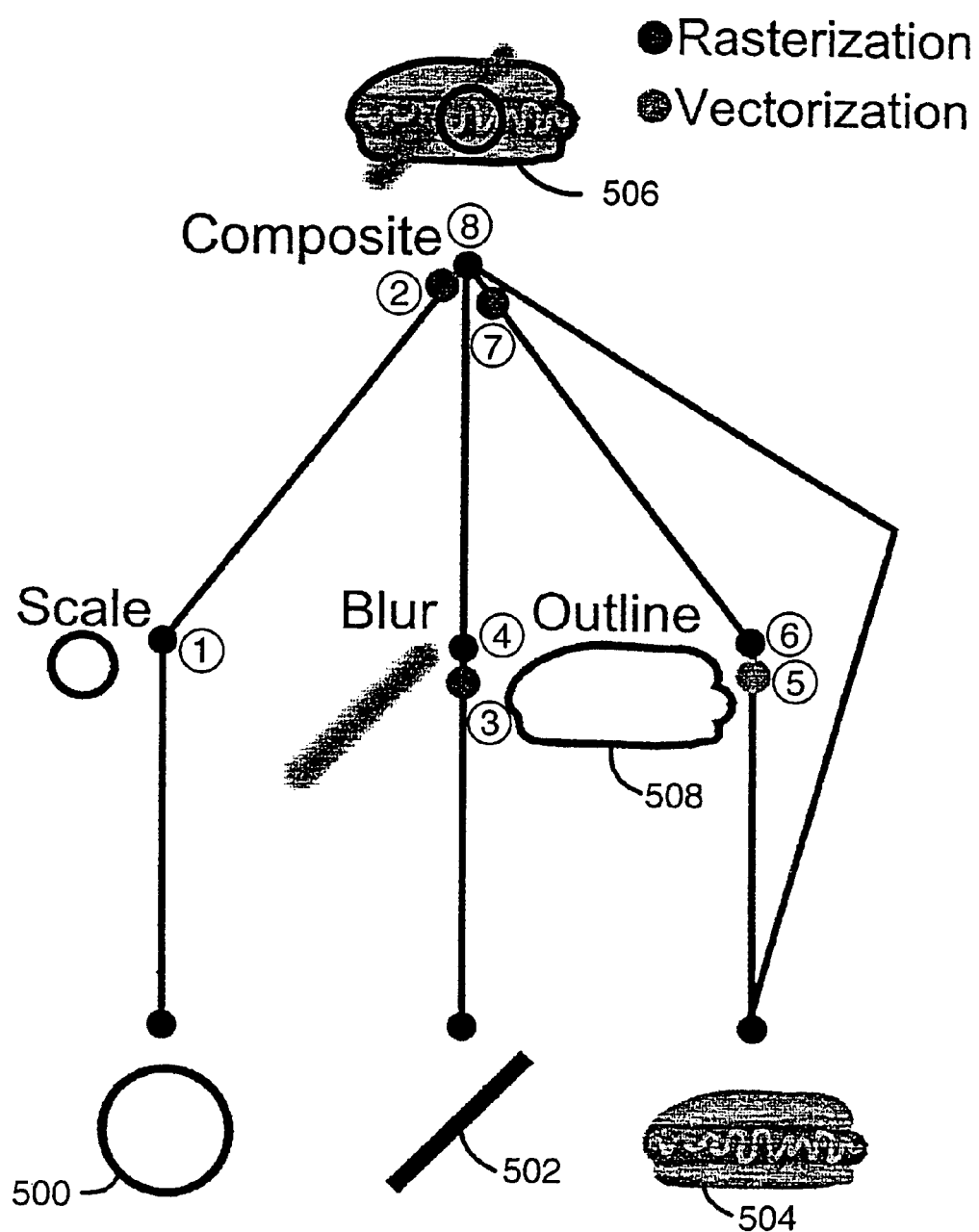
FIG. 6 illustrates a simplified schematic of a graph structure for storing image history, wherein the concept of automatic and intelligent data type conversion between raster and vector data types is depicted.

FIG. 6 exemplifies the manner in which these two principles are applied. In this example, the output device is a computer monitor that accepts only raster input. A first leaf sprite 500 is a vector representation of a circle, a second leaf sprite 502 is a vector representation of a line, and a third leaf sprite 504 is a raster representation of a frankfurter. The user scales the circle 500 down by a factor of one half, blurs the line 502, and outlines the frankfurter 504, before compositing the images as depicted at the root node 506. Automatic and intelligent type conversion occurs according to the above principles as follows. Although it is necessary to rasterize the vector circle before rendering it on the computer monitor, it is not necessary to rasterize it prior to the scaling operation. Thus, the scaling operation is carried out on the vector image data at node 1, and the vector image data is only rasterized at node 2 just prior to rendering at node 8. The various methods of rasterization are well known to those skilled in the art and will not be discussed at length here. With respect to the vector sprite 502 representing a line, it is necessary to rasterize the image data as depicted at node 3 prior to executing the blur operation at node 4, since a blur operation accepts only raster image data. This sprite is now raster data, and no further data conversion is necessary prior to rendering. The border of the raster sprite 504 is vectorized at node 5 by finding the border of the alpha channel in a manner well known in the art, in order to create an outline 508 of the raster image at node 6. The raster image 504 itself may require no further conversion prior to rendering depending on its resolution, while the vector outline 508 is rasterized at node 7 just prior to rendering.

Pursuant to the principle of automatic and intelligent type conversion, the conversion that occurs at nodes 2, 3, 5, and 7 is performed automatically in the sense that each conversion operator is automatically inserted into the graph at the appropriate point without user interaction or awareness. Additionally, converters are inserted as late in the chain of operators as possible. When the necessary conversion is from vector data to raster data, conversion parameters are preferably automatically selected such that conversion takes place at a resolution which is optimal for the current output device. For example, a typical computer display provides a resolution of 100 pixels per inch, or "ppi", while a high-resolution printer may support a resolution of 600 ppi. An application implementing the invention may obtain the parameters of the current output device by reading a quality setting or the like.

If the user generates the image depicted at the root node 8 in FIG. 6 for display on a monitor, but later selects an option to print the image to a high-resolution printer, there occurs automatic recalculation of the correct output using the graph-structured representation. Thus, the resolution parameters associated with the rasterization operations at nodes 2, 3, and 7 would automatically be changed from 100 ppi to 600 ppi, and the graph would automatically re-execute. Therefore, because the original images are retained as nodes of the acyclic graph, a user is not constrained by the resolution of a previous rasterization. This eliminates the need to query the user regarding their intended output device and desired conversion resolution, because the image is automatically re-rasterized at a different resolution when the current output device changes. This technique thus allows the user to remain ignorant regarding the use of two different data types and the details of rasterization, while retaining the ability to view and print images at a resolution which is tailored to the desired output device.

Additionally, the order of operators in the graph may be automatically altered to the extent necessary to yield a more efficiently executable graph structure, if doing so will not change the result that the user sees. For example, if the user requests a blur operation with respect to a vector line, and then requests a color change with respect to the blurred line, it will be more computationally efficient to execute the color change in the graph prior to the blur operator. Furthermore, the user cannot in this case discern from the image the order of operations. In such circumstances, it is preferable in one embodiment of the invention to reorder the operators in the graph accordingly.

Both raster and vector images generalize to three dimensions. Accordingly, the manipulations of both two-dimensional (2D) and three-dimensional (3D) images preferably appear to be substantially the same in terms of user steps and computation time for both raster and vector based images, in order to maintain the user's perception of indistinguishability. Thus, in addition to automatically converting between raster and vector data types, it is also often necessary to automatically convert between two-dimensional data types and three-dimensional data types in a manner which is invisible to the user. Note that for purposes of rendering the image data on a display device subsequent to manipulation, image data of 3D character is converted to a "flat," or 2D, raster representation.

Figure 7:
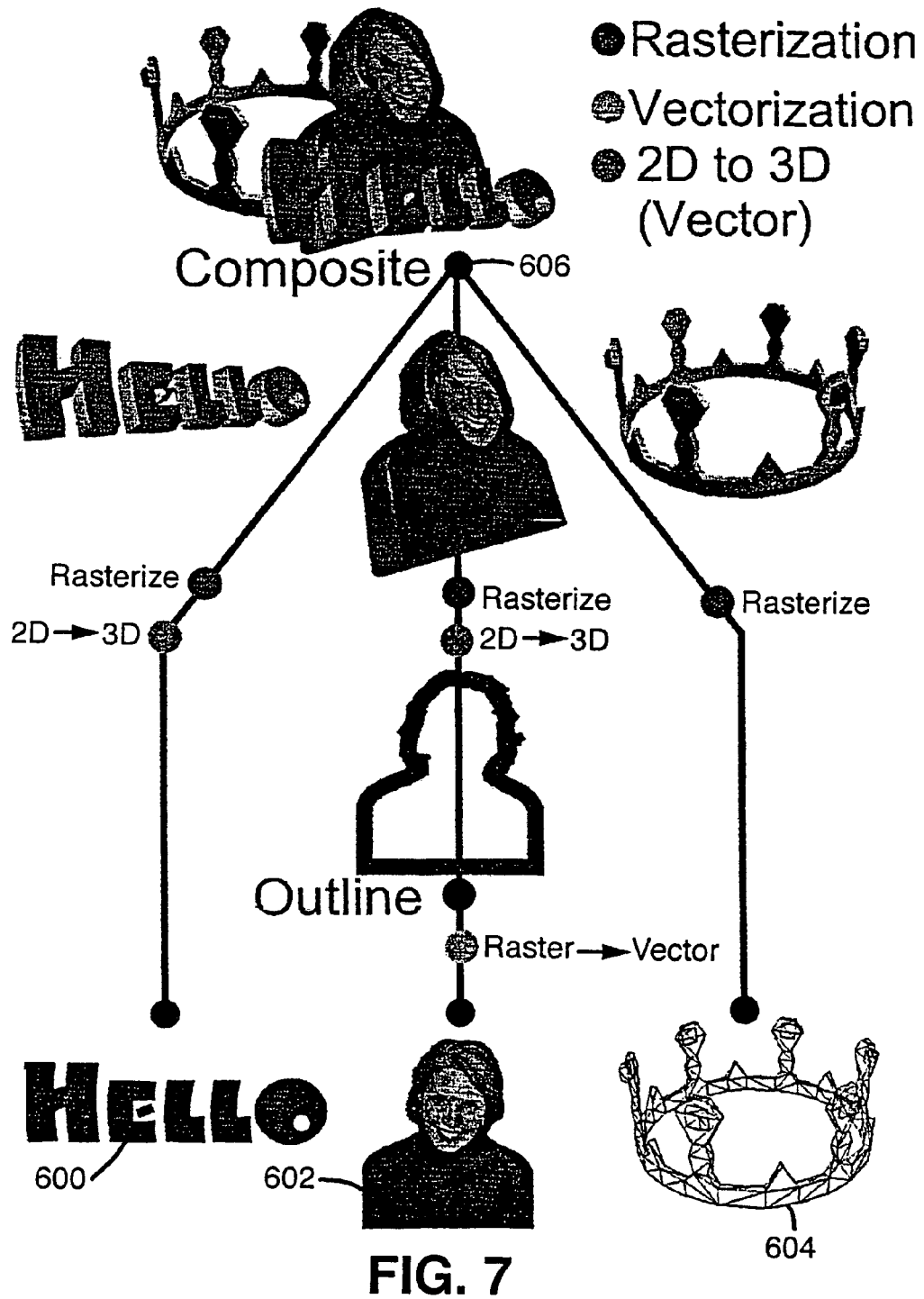
FIG. 7 illustrates a simplified schematic of a graph structure for storing image history, wherein the concept of automatic and intelligent data type conversion between raster and vector, and 2D and 3D data types is depicted.

A 2D vector sprite can be converted to 3D by a number of processes including extrusion. When converting a 2D raster sprite to 3D, the sprite is first converted to a 2D vector sprite, as discussed above, and then to a 3D vector sprite by extrusion or other means. The principle of automatic and intelligent type conversion applies to such conversions as well. For example, FIG. 7 depicts in graph form a series of manipulations requiring conversions between raster and vector data, and between 2D and 3D data, during which the user remains unaware that both raster and vector data types are in use, due to the automatic insertion of data type converters.

The leaf sprite 600 is 2D vector text, which is converted to 3D vector text using the techniques of extrusion and beveling. The extruded text is then automatically converted to 2D raster data for rendering via Gouraud shading. The leaf sprite 602 is a raster image, or bitmap, of a person, which pursuant to a user request for a 3D image is automatically converted to 3D vector data using outlining and extrusion. The 3D vector image data is then automatically converted to 2D via texture mapping for rendering. The leaf sprite 604 contains 3D vector data, which is automatically converted to 2D raster data for rendering via Gouraud shading. The resulting data from the above operations is then composited to create the image at the root node 606.

Furthermore, with respect to automatically inserted data type conversion operators, if user actions subsequently eliminate the need for a particular data type conversion, the associated conversion operator may be automatically removed from the graph. This may provide a more efficiently executable graph.

According to another embodiment of the invention, an image processing application may further support the indistinguishability of four-dimensional (4D) data types. For example, the dimension of time may be added to image data in keeping with the invention in at least two ways. Referring to the graph-structured representation, a leaf sprite may be made to vary in time, giving the appearance of movement or change as the graph is rapidly and repetitively executed. Alternatively, the parameters of the operators in the graph may change with time as the graph is re-executed. For example, a "Blur" operator may have an "amount of blur" parameter which increases with time, giving the impression that an image component is gradually and continuously becoming blurrier.

Figure 8:
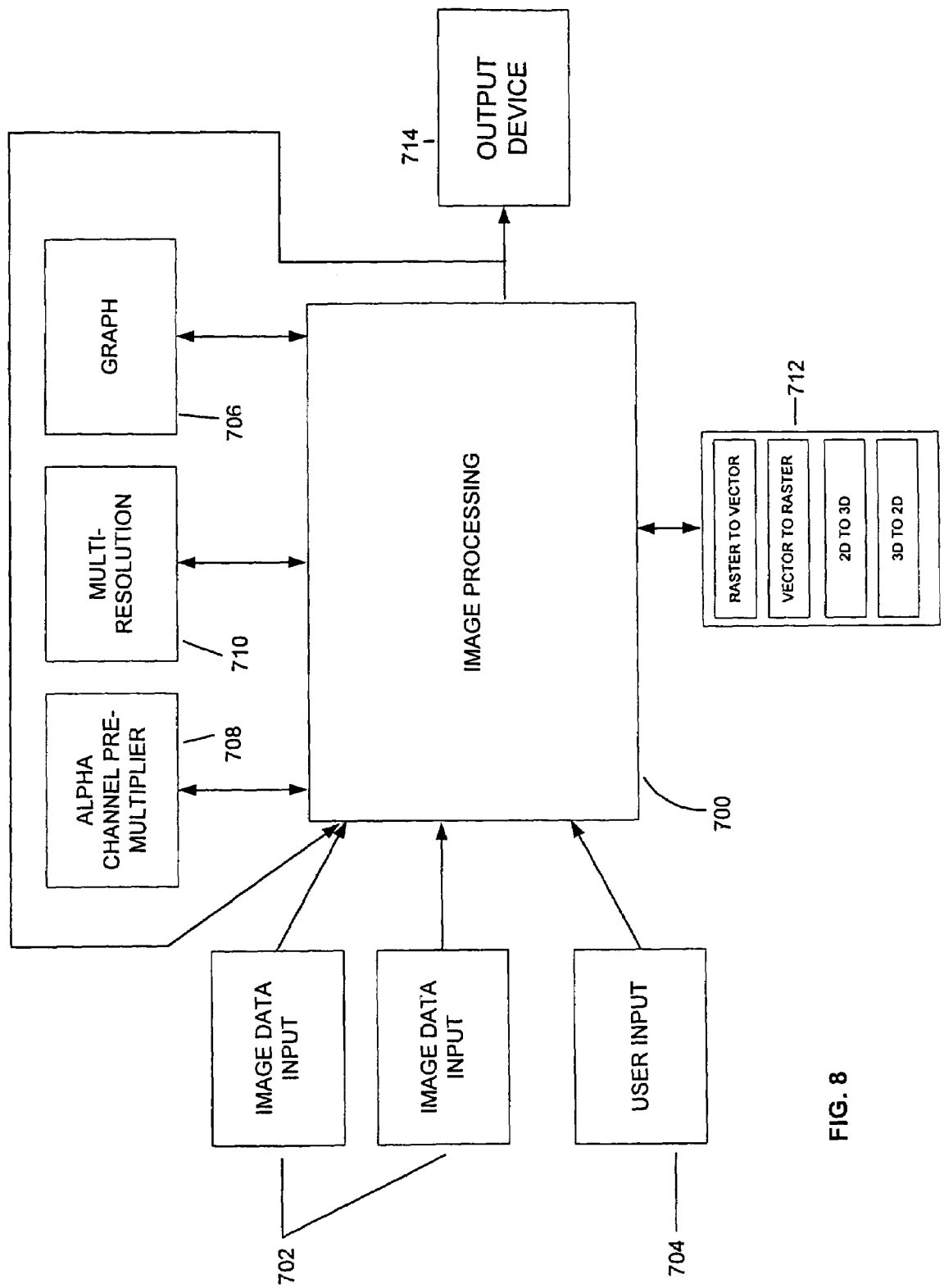
FIG. 8 depicts a conceptual component model of an embodiment of the invention.

FIG. 8 illustrates a conceptual component model of an image processing application that provides indistinguishable processing of raster and vector data types. The model consists of an image processing module 700 which takes as input one or more sets of image data 702 and some user input 704 requesting an image manipulation operation and containing any necessary parameters.

The processing module 700 automatically communicates each user input to the graph module 706 to be stored in an image history graph in accordance with the graph-structured representation, to facilitate the redo or undo of any or all image manipulation operations. If any image input 702 is a rectangular, or non-shaped, raster image, the processing module 700 automatically utilizes the alpha pre-multiplier module 708 to transform the image into a raster sprite. The processing module 700 then automatically utilizes the multi-resolution module 710 to store different resolution representations of the data, to facilitate rapid execution of any subsequent rescaling operations on the image. The multi-resolution module 710 may also store other pre-calculated versions of the image, such as pre-rotated or pre-sheared versions, to facilitate rapid execution of any subsequent corresponding operations.

The processing module 700 then ascertains, without user interaction, the data type required by the requested image manipulation operation to determine whether data type conversion is necessary. If data type conversion is necessary, the processing module 700 automatically utilizes the converter module 712 to convert the data prior to execution of the requested operation. Additionally, the processing module 700 instructs the graph module 706 to insert a node corresponding to the appropriate conversion into the graph, and to locate that node as late in the graph as possible. If the required conversion is from vector to raster data, the processing module 700 instructs the graph module 706 to associate a resolution parameter with the conversion node, where the resolution parameter is determined by reference to the resolution capability of the current output device.

Finally, the processing module 700 executes the operation. If data conversion is required in order to render the output in appropriate format for the current output device, it is carried out similarly to the conversion referred to above, including the placement of an entry in the graph. The image data output is provided to the output device and is also provided as an input to the processing module 700 for processing, as above, to the extent possible while awaiting further user input.

Although data types are indistinguishable to the user, it is not necessary that different operations be indistinguishable. Thus, for example, a given operation executed on an image of one data type preferably is executed at a rate perceptually consistent with the execution of the same operation on the other data type; yet a different operation may execute at a different rate from the given operation.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment may be modified in arrangement and detail without departing from the spirit of the invention. Additionally, although the invention has been described in the context of the traditional vector user interface paradigm, one skilled in the art will recognize that the invention may also be implemented to allow indistinguishable mixing of data types in other paradigms, such as the traditional raster image user interface paradigm. Furthermore, although raster sprites are referred to as non-rectangular, that term is simply used to indicate that such sprites are not rectangularly defined; a given sprite may still be rectangular by chance. Likewise, although the invention is preferably implemented using the pre-multiplied alpha representation as described to create shaped raster images, one skilled in the art will appreciate that shaped raster images usable with the invention may equivalently derive from any other method as well. Moreover, the technique of automatic and intelligent conversion is not limited to printers and monitors, in terms of the output device resolution used to set the conversion resolution. For example, the current output device may alternatively be a fax machine or other device. While the graph representation referred to herein is described as containing operators or operations, it is understood the graph may simply contain information identifying an operator or operation to be executed. Accordingly, the invention is not limited to the illustrated embodiments. Therefore, the invention as described herein contemplates all such embodiments as may come within the scope of the following claims and equivalents thereof.

We claim:

1. In a computer having memory wherein is stored raster data corresponding to a raster image and vector data corresponding to a vector image, a method of executing an image manipulation operation comprising the steps of:
   receiving user input requesting performance of an image manipulation operation on a selected one of the raster and vector images, the operation being selected by the user from a plural group consisting of all operations available for image manipulation within a single user interface for application to both raster and vector image types, with user input steps required to apply the operation to raster data being the same as user input steps required to apply the operation to vector data, wherein the selected image is the raster image and the requested image manipulation operation is one which resizes at least a portion of the selected image;
   automatically executing the requested image manipulation operation on the selected image, whereby the image manipulation operation is executed in substantially the same amount of time regardless of the data type of the selected image without regard to which image manipulation operation is requested;
   resampling the selected image, prior to the step of receiving user input requesting performance of an image manipulation operation, thereby producing at least one pre-calculated image having a different resolution than the selected image, wherein the resolution of the pre-calculated image varies from the resolution of the selected image by a predetermined multiplicative factor, wherein the resolution of the pre-calculated image varies from the resolution of the selected image by a factor of an integral power of two;
   storing in the memory the pre-calculated image; and
   using the stored pre-calculated image when performing the step of automatically executing the requested image conversion operation.

2. In a computer having memory wherein is stored raster data corresponding to a raster image and vector data corresponding to a vector image, a method of executing an image manipulation operation comprising the steps of:
   receiving user input requesting performance of an image manipulation operation on a selected one of the raster and vector images, the operation being selected by the user from a plural group consisting of all operations available for image manipulation within a single user interface for application to both raster and vector image types, with user input steps required to apply the operation to raster data being the same as user input steps required to apply the operation to vector data;
   automatically executing the requested image manipulation operation on the selected image, whereby the image manipulation operation is executed in substantially the same amount of time regardless of the data type of the selected image without regard to which image manipulation operation is requested; and
   eliminating at least some transparent pixels from the raster data corresponding to the raster image to form a raster sprite, wherein the raster data comprises a pre-multiplied alpha channel.

3. In a computer having memory wherein is stored raster data corresponding to a raster image and vector data corre sponding to a vector image, a method of executing an image manipulation operation comprising the steps of:

receiving user input requesting performance of an image manipulation operation on a selected one of the raster and vector images, the operation being selected by the user from a plural group consisting of all operations available for image manipulation within a single user interface for application to both raster and vector image types, with user input steps required to apply the operation to raster data being the same as user input steps required to apply the operation to vector data;

automatically executing the requested image manipulation operation on the selected image, whereby the image manipulation operation is executed in substantially the same amount of time regardless of the data type of the selected image without regard to which image manipulation operation is requested;

storing in the memory a graph, the graph comprising nodes representing ordered image manipulation operations which have been executed on the selected image in processing the selected image; and automatically inserting in the graph a third node at a location between a first node and a second node, wherein said third node corresponds to at least one of a rasterization operator, a vectorization operator and a conversion operator.

4. The method according to claim 3, wherein the selected image is the vector image and the method further comprises the steps of:

determining whether an operation represented by the second node in the graph is only executable on raster image data; and if the operation is only executable on raster image data, and if the first node in the graph immediately prior to the second node yields data in vector format, automatically inserting in the graph at the location between the first and second nodes the third node corresponding to the rasterization operator, wherein the rasterization operator is operable to convert the image data corresponding to the selected image to raster image data.

5. The method according to claim 4, wherein the computer is associated with an output device and the method further comprises the steps of; determining the image resolution of the output device; and associating with the rasterization operator a resolution parameter, wherein the resolution parameter corresponds to the image resolution of the output device.

6. The method according to claim 5, wherein the step of determining the image resolution of the output device further comprises the step of reading a quality setting corresponding to the output device.

7. The method according to claim 3, wherein the selected image is the raster image and the method further comprises the steps of;

determining whether an operation represented by the second node in the graph is only executable on vector image data; and if the operation is only executable on vector image data, and if the first node in the graph immediately prior to the second node yields data in raster format, automatically inserting in the graph at the location between the first and second nodes the third node corresponding to the vectorization operator, wherein the vectorization operator is operable to convert the image data corresponding to the selected image to vector image data.

8. The method according to claim 3, wherein the selected image is a two-dimensional image and the method further comprises the steps of;

determining whether an operation represented by the second node in the graph is only executable on three-dimensional image data; and if the operation is only executable on three-dimensional image data, and if the first node in the graph immediately prior to the second node yields data in two-dimensional format, automatically inserting in the graph at the location between the first and second nodes the third node corresponding to the conversion operator, wherein the conversion operator is operable to convert the image data corresponding to the selected image to three-dimensional image data.

9. The method according to claim 3, wherein the selected image is a three-dimensional image and the method further comprises the steps of;

determining whether an operation represented by the second node in the graph is only executable on two-dimensional image data;

and if the operation is only executable on two-dimensional image data, and if the first node in the graph immediately prior to the second node yields data in three-dimensional format, automatically inserting in the graph at a location between the first and second nodes the third node corresponding to the conversion operator, wherein the conversion operator is operable to convert the image data corresponding to the selected image to two-dimensional image data.

10. In a computer having memory wherein is stored raster data corresponding to a raster image and vector data corresponding to a vector image, a method of executing an image manipulation operation comprising the steps of:

receiving user input requesting performance of an image manipulation operation on a selected one of the raster and vector images, the operation being selected by the user from a plural group consisting of all operations available for image manipulation within a single user interface for application to both raster and vector image types, with user input steps required to apply the operation to raster data being the same as user input steps required to apply the operation to vector data;

automatically executing the requested image manipulation operation on the selected image, whereby the image manipulation operation is executed in substantially the same amount of time regardless of the data type of the selected image without regard to which image manipulation operation is requested;

storing in the memory a graph, the graph comprising nodes representing ordered image manipulation operations which have been executed on the selected image in processing the selected image;

determining whether an alteration of the order of the nodes representing image manipulation operations in the graph to create an alternative graph would yield an alternative graph which is more efficiently executable than the graph, wherein each of the graph and the alternative graph has an output;

if the alteration would yield an alternative graph which is more efficiently executable than the graph, determining whether the output of the graph is the same as output of the alternative graph would be; and if the output of the graph is the same as the output of the alternative graph would be, automatically altering the order of the nodes representing image manipulation operations in the graph to yield the alternative graph.

* * * * *